United States Patent
Okonek et al.

(10) Patent No.: US 12,546,220 B2
(45) Date of Patent: Feb. 10, 2026

(54) SCREWING-IN SYSTEM FOR INSERTING A THREADED ROD INTO SOIL

(71) Applicant: Spinnanker GmbH, Vienna (AT)

(72) Inventors: Peter Okonek, Giesshübl (AT); Luca Guerra, Gablitz (AT)

(73) Assignee: Spinnanker GmbH, Vienna (AT)

( * ) Notice: Subject to any disclaimer, the term of this patent is extended or adjusted under 35 U.S.C. 154(b) by 151 days.

(21) Appl. No.: 18/382,021

(22) Filed: Oct. 19, 2023

(65) Prior Publication Data

US 2024/0133296 A1 Apr. 25, 2024
US 2024/0229646 A9 Jul. 11, 2024

(30) Foreign Application Priority Data

Oct. 21, 2022 (EP) .................................. 22203095

(51) Int. Cl.
*E21D 20/00* (2006.01)
*E21D 21/00* (2006.01)

(52) U.S. Cl.
CPC ....... *E21D 20/003* (2013.01); *E21D 21/0066* (2016.01)

(58) Field of Classification Search
CPC ....... E02D 5/801; E02D 5/54; E04H 12/2223; E21D 21/0086; E21D 20/003; E21D 21/0066
See application file for complete search history.

(56) References Cited

U.S. PATENT DOCUMENTS

| | | | | |
|---|---|---|---|---|
| 2,811,335 A | * | 10/1957 | Fletcher | E21D 20/003 173/147 |
| 2,826,281 A | * | 3/1958 | Johnson | E04H 12/223 248/188 |
| 2,870,884 A | * | 1/1959 | Mazur | E02D 5/80 52/158 |
| 4,036,026 A | * | 7/1977 | Asayama | E21D 20/003 405/262 |
| 7,607,866 B2 | * | 10/2009 | Eddowes | E21B 19/16 405/259.1 |

(Continued)

FOREIGN PATENT DOCUMENTS

| | | |
|---|---|---|
| CN | 109441443 A | 3/2019 |
| WO | 2020047562 A1 | 3/2020 |

OTHER PUBLICATIONS

European Search Report dated Mar. 28, 2023 for corresponding European Patent Application No. 22203095.

*Primary Examiner* — Benjamin F Fiorello
(74) *Attorney, Agent, or Firm* — Dentons Cohen Grigsby, P.C.; Michael E. Dukes

(57) ABSTRACT

A screwing-in system for inserting a threaded rod in the axial direction into a substrate, having a drive machine which rotationally drives a drive sleeve, it being possible to insert the threaded rod into the drive sleeve arranged on the drive machine, which drive sleeve can be connected to the threaded rod in a form-fitting manner and thus rotationally drives the threaded rod, wherein a component provided with an internal thread is fixed between the drive machine and the substrate, which component converts the rotational movement of the drive sleeve into a translational movement of the threaded rod, wherein the screwing-in machine is mounted on a carriage which is movable relative to the component.

19 Claims, 6 Drawing Sheets

(56) References Cited

U.S. PATENT DOCUMENTS

| | | | | |
|---|---|---|---|---|
| 8,714,881 | B2* | 5/2014 | Gagliano | E02D 5/22 |
| | | | | 405/257 |
| 11,725,514 | B2* | 8/2023 | Fourie | E21D 20/003 |
| | | | | 405/259.1 |
| 11,933,014 | B2* | 3/2024 | Gale | E02D 5/54 |
| 12,030,194 | B1* | 7/2024 | Varone | F16M 11/14 |
| 2004/0118578 | A1* | 6/2004 | O'Meley | E21D 20/003 |
| | | | | 173/152 |
| 2009/0139772 | A1 | 6/2009 | Miyanaga | |
| 2014/0079492 | A1* | 3/2014 | Mayrhofer | F16B 43/02 |
| | | | | 405/259.1 |
| 2014/0174003 | A1* | 6/2014 | Despotellis | E02D 5/80 |
| | | | | 52/169.13 |
| 2015/0275667 | A1* | 10/2015 | Comorge | E21D 20/003 |
| | | | | 405/259.5 |
| 2016/0130778 | A1* | 5/2016 | Levey | E02D 5/801 |
| | | | | 405/259.1 |
| 2021/0381188 | A1* | 12/2021 | Wójcikowski | E01F 9/685 |
| 2022/0018253 | A1 | 1/2022 | Crompton et al. | |

* cited by examiner

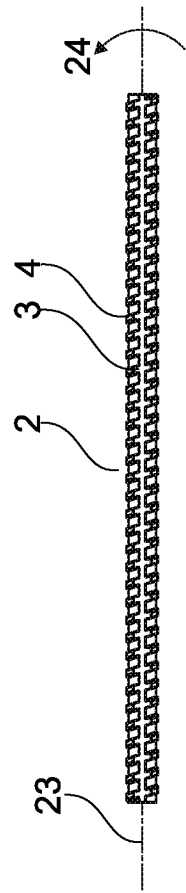
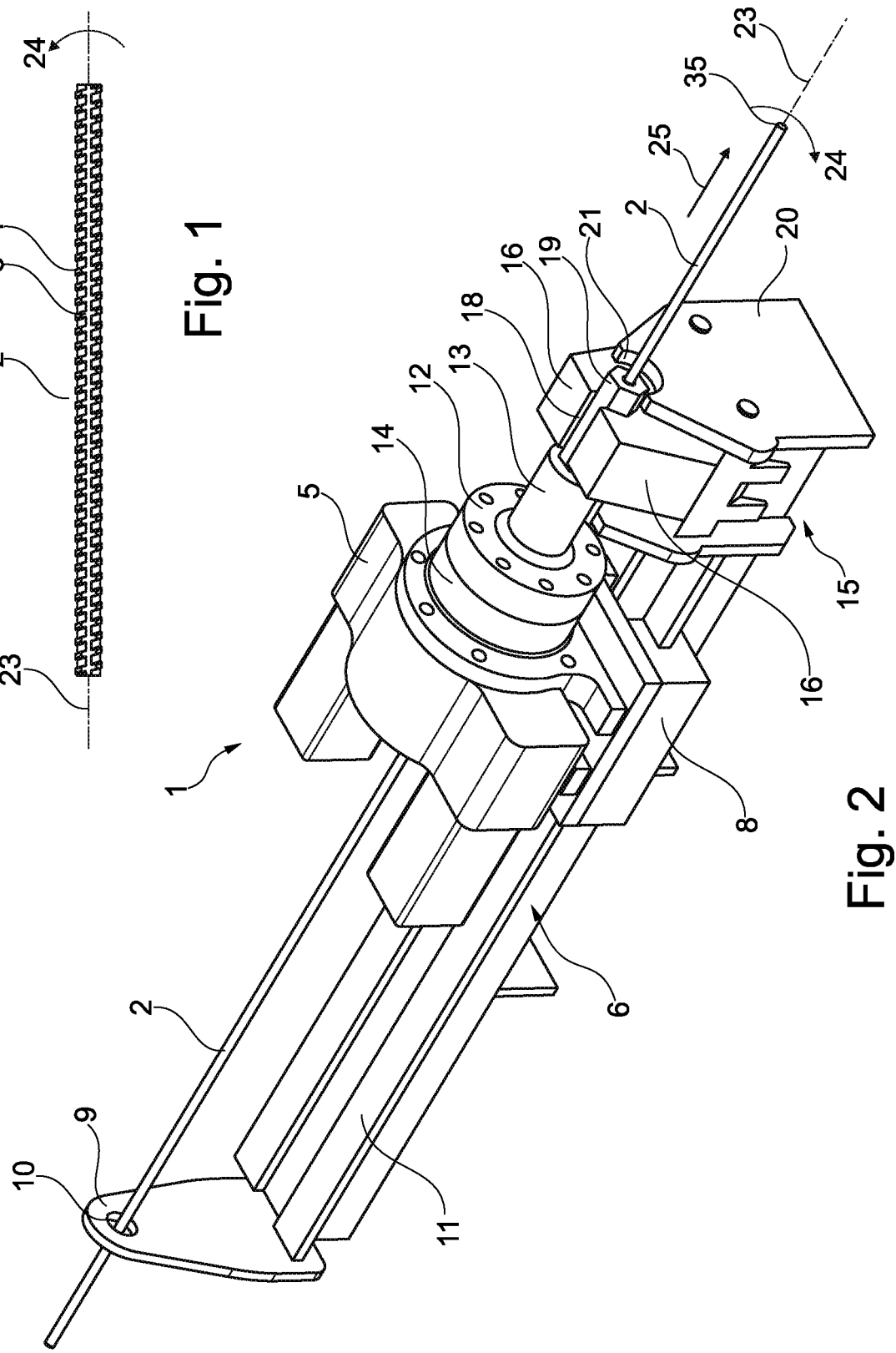

SCREWING-IN SYSTEM FOR INSERTING A THREADED ROD INTO SOIL

CROSS-REFERENCE TO RELATED APPLICATIONS

This application claims priority under 35 U.S.C. § 119 to European patent application EP 22203095.9 filed Oct. 21, 2022, the disclosure of which is incorporated herein by reference.

FIELD OF THE INVENTION

The object of the invention is a screwing-in system for inserting a threaded rod into a substrate as well as a method for inserting such a threaded rod.

BACKGROUND

EP 2 689 071 B2 shows a screwing-in system for inserting a threaded rod in the axial direction into a substrate with a drive machine that rotationally drives a drive sleeve, wherein the threaded rod can be inserted into the drive sleeve, which rotationally drives the threaded rod in a form-fitting manner. In addition, a component provided with an internal thread is arranged between the drive machine and the substrate, which converts the rotational movement of the drive sleeve into a translational movement of the threaded rod.

Such screwing-in systems, in which a threaded rod is rotated through a form-fit connection inside a tool, have the problem that the threaded rod moving through the tool loads the mechanics of the screwing-in system. This is due to the high internal friction inside the mold and the associated heat generation. Thus, failures of the screwing-in system can occur or the screwing-in process can be slowed down if care is taken to ensure that the drive sleeve is loaded gently.

The present invention is thus based on the task of enabling safe and cost-effective screwing of threaded rods into a substrate without pre-drilling, using a simple, low-wear mechanism that reduces assembly time.

SUMMARY

The task is solved according to the invention by the features of the independent patent claims, while advantageous embodiments and further developments of the invention can be taken from the subclaims.

An advantageous feature is that the screwing-in machine is mounted on a carriage which is movable relative to a component with a thread. The thrust speeds of the carriage are calculated from revolutions per minute×thread pitch in cm.

The screwing-in system has a mounting with at least one rail on which the carriage can be moved back and forth in translation in order to minimize the internal friction in the drive sleeve that drives the threaded rod in rotation during the screwing-in process.

In principle, the carriage is mounted on a linear support and guide element and can be moved relative to the position-fixed threaded socket. This linear support and guide element is a toothed rack or, preferably, a rail.

The drive sleeve engages positively with a profiling on its inner circumference on the threaded rod in order to rotate it about its axis of rotation. This internal profiling ensures positive engagement on the lateral surface of the threaded rod, in particular on the wrench flats, wherein the profiling of the drive sleeve is matched to the wrench flat of the threaded rod. According to the shape of the threaded rod to be screwed in, a drive sleeve adapted to it is used, which can be interchangeably connected to the drive machine.

In a preferred embodiment, the profiling on the inner circumference of the drive sleeve is provided with two parallel or angularly opposed surfaces which receive the threaded rod with a corresponding "wrench size" within them. These surfaces, figuratively speaking, have a wrench dimension between them, which at least partially matches the profile shape of the threaded rod, and thus fulfill a wrench function.

The profiled inner diameter of the drive sleeve is, so to speak, the negative shape of the rod.

The present invention is not limited to the use of one pair of surfaces, as three or more surfaces can also be driven, for example.

With this screwing-in machine, which primarily has a hydraulic but also electric or air-driven rotary drive, a threaded rod is thus driven in rotation and undergoes a feed movement through an upstream thread of a threaded socket or alternatively of a nut when the thread of the rod engages in the thread of the sleeve, etc. The thread of the threaded socket or, alternatively, of the nut is driven in rotation.

In the following, a threaded socket is understood to be a hollow body of any shape which is formed with an internal thread which is in threaded engagement with the external thread of the threaded rod.

The threaded socket is preferably held within the screwing-in system by a clamping device mounted on the mounting at the substrate end of the carriage. Preferably, the threaded socket is held in position within the clamping device by two or more movable clamping jaws or, alternatively, is fixed to a stock structure by means of one or more clamping jaws or is held in position manually with an open-end wrench.

Rotational engagement with the thread of a fixed threaded socket forces the threaded rod to move axially and moves through the threaded socket.

Thus, in a method for screwing a threaded rod into soil or rock by means of a mounting and a carriage which is translationally movable on rails of the mounting, with a drive machine arranged on the slide, which is in positive engagement with the threaded rod by means of a drive sleeve, compensation of a feed movement of the threaded rod is made possible.

The threaded rod can be inserted into the drive sleeve, which is driven in rotation in the assembly head, via an insertion opening arranged on the assembly head and drives the threaded rod in rotation in the longitudinal direction.

For this purpose, it is known to provide the threaded rods with flat areas on opposite sides so that the thread pitches are only arranged outside these flat areas on the outer circumference of the threaded rod in each case. In the following, these flat areas will be referred to as the wrench flats.

In this way, it is possible to insert the threaded rod into the rotationally driven drive sleeve, which is profiled to match the profile of the threaded rod described above, and there to establish the frictional connection with the flat sides of the threaded rod, after which the drive sleeve is then rotationally driven, transmitting a torque and the threaded rod is screwed through from above downwards through the threaded hole into a component with an internal thread.

There is a small amount of play between the profiling of the drive sleeve and the wrench flats of the threaded rod, so that the threaded rod can be pulled out of the drive sleeve when the surfaces of the profiling and the wrench flats are opposite each other. This also allows the drive sleeve to be moved along the threaded rod without engaging the wrench flats. In particular, when the drive sleeve has reached the threaded socket due to the relative movement of the drive machine, the rotary drive is deactivated and the drive sleeve is pulled back along the threaded rod onto the carriage, where engagement between the drive sleeve and the wrench flats occurs again. For such an engagement, the parallelism between the profiling of the drive sleeve and the wrench flat is eliminated so that the surfaces are slightly oblique to each other and there is contact to transmit the rotary motion of the drive machine to the threaded rod.

In one further development, the rotary drive of the drive sleeve is disengaged during the retraction process. This means that there is little or no resistance from the drive sleeve to the threaded rod.

By placing the threaded rod on an element with a threaded hole, for example a threaded socket, the thread-like profiling of the threaded rod comes into engagement with the thread of the threaded hole of the element, the internal thread of the threaded hole having the same pitch as the threaded rod.

For simplicity, the invention is described below using a threaded socket, but any other element can be used which has an internal thread into which the threaded rod can be screwed.

Due to the drive machine running along in the feed direction, axial movement of the threaded rod is possible without any significant friction.

This makes it possible to achieve a greater speed of movement with a lower drive power. In addition, a profiling of the drive sleeve corresponding to the drive profile of the threaded rod allows for less wear. Thus, according to the invention, there is less frictional resistance than, for example, with the known devices, which have a high surface friction.

Thus, the device according to the invention can reduce wear and tear and setup time.

With the screwing-in system according to the invention, not only a feed, i.e., a screwing-in movement of the threaded rod is possible, but also an unscrewing movement of the threaded rod.

The drive machine is mounted on a mounting and moves with the feed movement of the threaded rod. This feed movement is analogous to the bar length, i.e., an adjustment usually takes place between ⅓ and ¼ of the bar length, for example 1 to 3 meters With the screwing-in system, hundreds of linear meters of threaded rods can be inserted in a very short time. With the large number of threaded rods inserted, one can either produce many anchorage points in a short time or produce foundations for higher load ranges, e.g., temporary bridge bearings with over 1200 KN foundation load.

As soon as the drive sleeve driven by the rotary drive, which is in a form-fit connection with the threaded rod, has reached the threaded socket as a result of the feed movement, it is pulled along the mounting again in the opposite direction without rotary drive. This prevents the threaded rod from rotating again in the opposite direction. Once the carriage with the drive sleeve has moved back to the starting point at the beginning of the rails, the screwing-in process starts again.

The drive sleeve is interchangeably connected to the drive machine by means of a flange connection.

Depending on the outer profile shape of the threaded rods, a drive sleeve with a corresponding inner profile can be used. For example, rods with a diameter of 15 mm can be turned with one drive sleeve, and to drive rods with a diameter of 26 mm, another drive sleeve is mounted over the flange connection.

The sleeve is made of a hardened steel and is therefore harder than the threaded rod; tungsten carbide-cobalt is the preferred material.

In another embodiment, only the inner sleeve is made of tungsten carbide-cobalt and the outer sleeve is made of a more favorable material with a higher yield strength.

Preferably, the drive machine is a hydraulic rotary drive which, due to its compact cylindrical design, can be mounted on the mounting in a space-saving manner for rotary movements, and which is particularly well suited for applications with large radial loads that occur. This allows the threaded rod to be inserted into the substrate without any problems, as the acting forces can be absorbed by the bearing of the drive.

The drive machine running on the rails thus generates a rotation of the threaded rod, which is converted into a translation by the threaded socket. As the drive machine runs with the drive sleeve during the feed movement of the threaded rod, there is no loss due to friction between the drive sleeve and the threaded rod.

On the one hand, this results in significantly less wear in the sleeve (longer service life), and on the other hand, the threaded rods can be screwed in deeper with the same torque.

A method of screwing a threaded rod into soil or rock, comprising a drive machine having a drive sleeve which produces a positive engagement with the threaded rod by means of an internal profiling to drive the threaded rod rotationally and to screw it through the thread of a threaded socket, wherein the rotational movement of the threaded rod through the threaded socket is converted into a translational movement in order to drive the threaded rod at its front end into the soil or rock, characterized in that the drive machine is mounted on a translationally movable carriage and is moved along the axis of the threaded rod in accordance with the feed movement of the threaded rod.

The carriage is mounted on a guide (e.g., rail, toothed rack, etc. . . . ) and can be moved relative to the position-fixed threaded socket.

The drive sleeve interrupts the positive connection with the threaded rod when the carriage moves against the direction of insertion, in order to create a positive connection again at another area of the threaded rod and to drive the threaded rod to rotate again.

The carriage is moved relative to the threaded socket along one or more rails using a linear drive, whereby rails means a positive longitudinal guide.

The mounting can be mounted on the boom arm of a mobile vehicle. Such a vehicle is a tracked vehicle, a quad, or similar.

The subject-matter of the present invention results not only from the subject-matter of the individual patent claims, but also from the combination of the individual patent claims with each other.

All details and features disclosed in the documents, including the abstract, in particular the spatial configuration shown in the drawings, could be claimed as essential to the invention insofar as they are individually or in combination new compared to the prior art. The use of the terms "essential" or "according to the invention" or "essential to the invention" is subjective and does not imply that the features so designated must necessarily be part of one or more patent claims.

BRIEF DESCRIPTION OF THE DRAWINGS

In the following, the invention is explained in more detail with reference to drawings illustrating several embodiments. Here, further features and advantages of the invention essential to the invention are apparent from the drawings and their description, wherein:

FIG. 1 shows a front view of a threaded rod;

FIG. 2 shows a perspective view of the screwing-in system;

DETAILED DESCRIPTION

Figure 3:
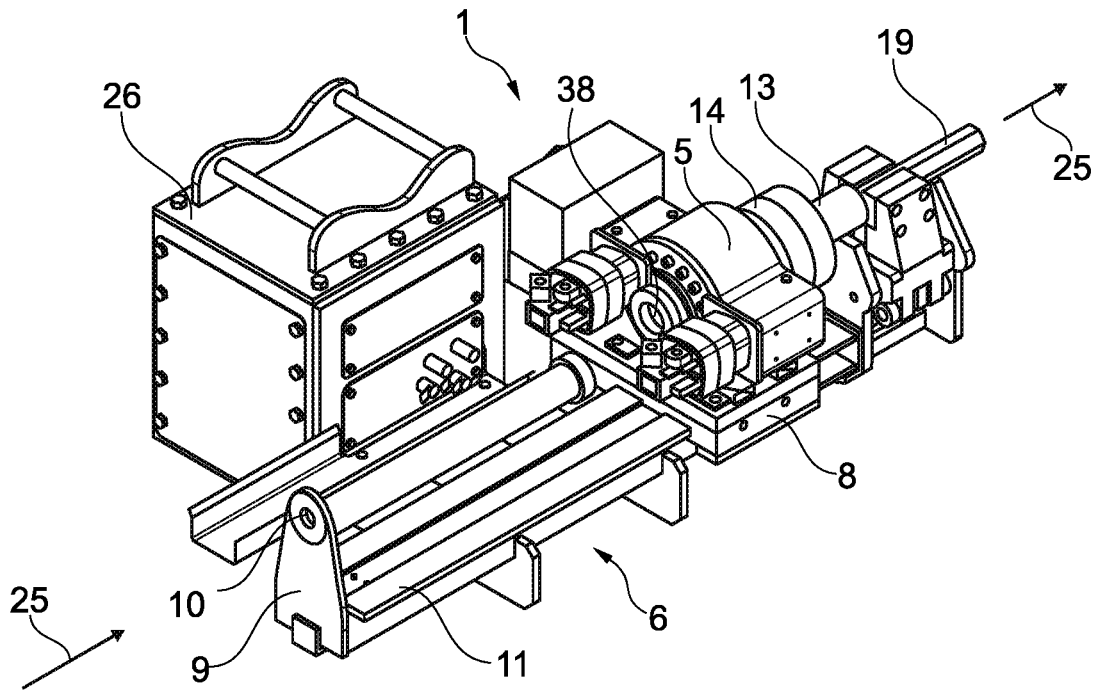
FIG. 3 shows a rear perspective view of the screwing-in system.

FIG. 1 shows a threaded rod 2 which can be rotated in the direction of rotation 24 about a threaded rod axis 23 running centrally in the axial direction through the threaded rod. The threaded rod has a thread 4 on its outer circumference at certain sections, which has a continuous helix despite interruptions in the axial direction. Outside these sections, the threaded rod has flat areas which form the drive profile of the threaded rod and are referred to below as wrench flats 3.

FIG. 2 shows the screwing-in system 1, with which the threaded rod 2 can be inserted into a substrate 22. For this purpose, the threaded rod 2 is driven in rotation by a drive sleeve 13, with a threaded socket 19 converting this rotation into translation in the direction of arrow 25. The inner profile 34 of the drive sleeve 19 forms a clamping chuck for the threaded rod 2.

The drive sleeve 13 is detachably and replaceably connected to the rotary coupling 14 via a flange connection 12, which transmits a rotary motion generated by the drive machine 5 to the drive sleeve 13.

The drive machine 5 is mounted on a carriage 8 which can move forward in the direction of arrow 25 and backward in the direction opposite to the direction of arrow 25. For this purpose, the carriage is mounted on two rails 11, which are part of the mounting 6.

A feed drive 27 moves the carriage forward on the mounting 6 while the threaded rod 2 is rotated about its threaded rod axis 23 in the direction of rotation 24.

The threaded rod 2 is clamped in the profiling 34, which has the function of a clamping chuck, of the drive sleeve 13 and then the threaded rod is placed with its front end 33 on the thread of the threaded socket 19 and then the drive machine 5 is switched on.

The threaded rods 2 are screwed into the substrate 22 automatically, so to speak, because the feed of the threaded rods 2 is caused by the engagement of the thread 4 of the threaded rods 2 in the threaded socket-side thread.

The rotating drive of the drive sleeve 13 thus drives the rotating threaded rod 2, which moves at a feed rate, progressively into the soil or rock below the threaded socket 19. This is assisted by the thread 4, since the thread pitches of the thread 4 arranged on its circumference pull the threaded rod into the substrate 22.

In this case, the threaded rod 2 can be inserted into the drive sleeve 13, which is driven in rotation at the front of the drive machine 5, via an insertion opening 38 arranged at the rear of the drive machine 5, which in turn drives the threaded rod 2 in rotation in the longitudinal direction.

The threaded socket 19 is received in the clamping opening 18, which is formed between two clamping jaws 16. These clamping jaws 16 are part of the clamping device 15.

The mounting 6 has a guide plate 20 at its substrate end, after the clamping device 15, with a crescent-shaped recess 21 at the top end through which the threaded rod 2 passes.

The mounting 6 also has a similar guide plate 9 at its insertion end, which has a hole 10 through which the threaded rod 2 is inserted.

FIG. 3 shows another perspective view of the screwing-in system 1 without threaded rod. One of these is guided through the hole 10 of the guide plate 9 in the direction of arrow 25 to equip the mounting 6 and is inserted at the rear into the insertion opening 38 of the drive machine 5 until contact is made with the drive sleeve 13.

Due to the internal profiling 34 of the drive sleeve 13, which has a certain amount of clearance to the wrench flats 3 of the threaded rod 2, the rod can be pushed through the drive sleeve until it protrudes from the drive sleeve 13. Preferably, the carriage 8 is located at the guide plate 9, i.e., at the insertion end of the rails 11. The threaded rod 2 is passed through until it rests on the thread of the threaded socket 19 at the substrate-side end of the carriage 11. Subsequently, the drive sleeve 13 is driven to rotate by the drive machine 5 so that this rotation is transmitted to the threaded rod 2.

Here, the threaded rod 2 experiences a feed in the direction of arrow 25 due to the thread engagement in the thread of the threaded socket 19, wherein the drive machine 5 also travels on the carriage at the same speed in the direction of arrow 25. The movement of the carriage is controlled by the control unit 26, which transmits the corresponding control commands to the feed drive 27 shown in FIG. 4.

Thus, the drive sleeve 13 engages only in a constant section of the threaded rod 2 during the entire feed distance of the carriage 8 between the end on the insertion side and the end on the substrate side of the rails 11 and drives it in rotation.

When the maximum feed movement in which the carriage 11 can travel is reached, which is the case when the drive sleeve 13 has reached the threaded socket 19, the positive locking between the drive sleeve 13 and the threaded rod 2 is cancelled and the carriage 8 with the drive machine 5 is moved against the direction of the arrow 25 along the threaded rod axis 23 of the threaded rod 2 until the insertion end of the rails 11 is reached. At this position, the drive sleeve 13 again engages the wrench flats 3 of the threaded rod 2, although this time it is a different area of the threaded rod.

Figure 4:
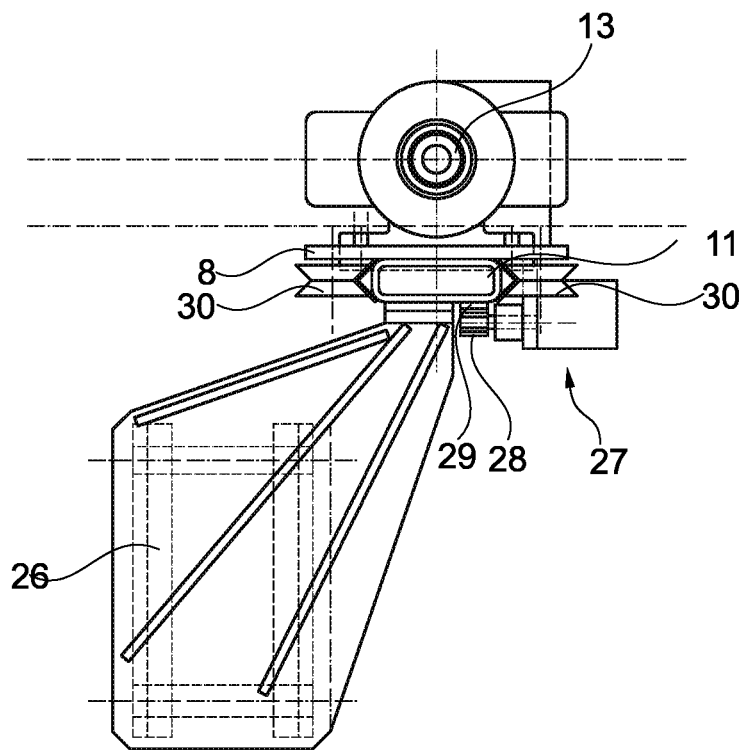
FIG. 4 shows a sectional view of the screwing-in system from the left side.

FIG. 4 shows a partially cutaway view of the screwing-in system 1. The control unit 26 controls, among other things, the feed drive 27 of the carriage 8. The feed drive 27 rotationally drives a roller 28, which rolls along the underside 29 of the rail 11. Alternatively, a toothed wheel is provided which engages with a toothed rack on the underside. The frictional connection thus created thus moves the carriage 8, which is connected to the feed drive 27, along the longitudinal extent of the rail 11. Thus, the drive sleeve 13 can be moved to any position along the rail 11 and engage the threaded rod 2 at defined areas.

In addition, the follower rollers 30 are located laterally of the rails 11, which support the linear movement of the carriage 11 laterally.

Figure 5:
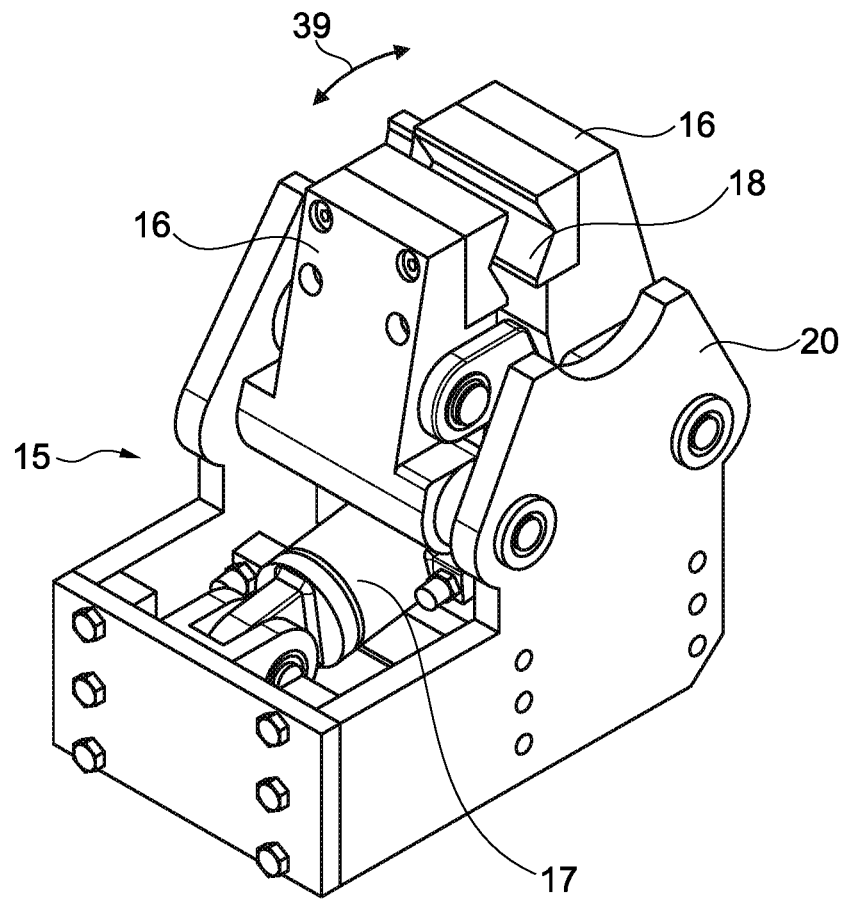
FIG. 5 shows a perspective view of the clamping device.

FIG. 5 shows the clamping device 15, which actuates the two clamping jaws 16 in and against the opening direction 39 via a clamping drive 17. The two clamping jaws 16 form a clamping opening 18 between them, into which a threaded socket 19 not shown here can be received and fixed in position. The guide plate 20, which also forms the substrate end of the mounting 6, is located at the substrate end of the clamping device 15.

Figure 6:
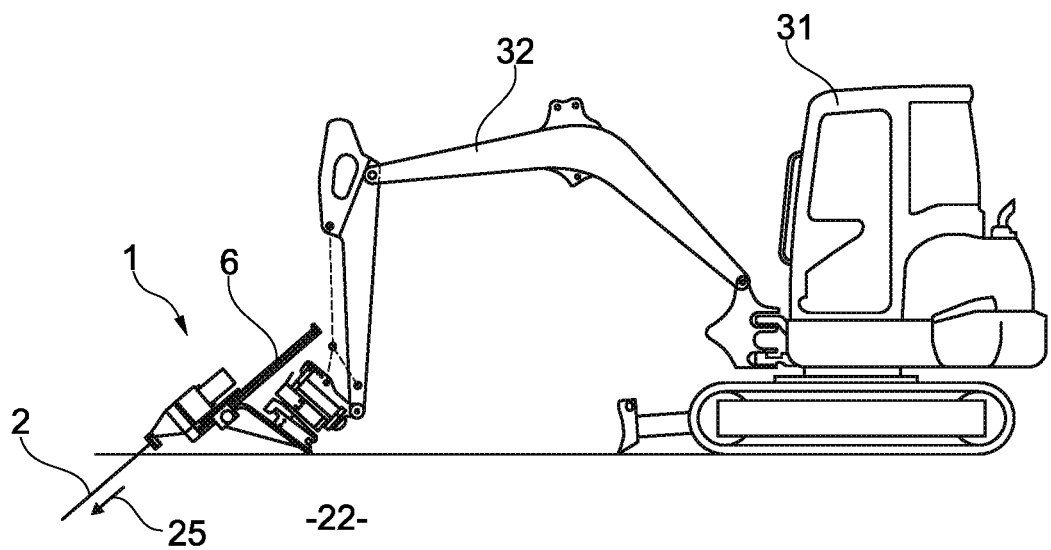
FIG. 6 shows a schematic view of a tracked vehicle with screwing-in system.

FIG. 6 shows a tracked vehicle 31, which in the example shown here is an excavator, with a hydraulically raisable and lowerable boom arm 32, on which the mounting 6 is mounted and can be freely moved by means of the boom arm and aligned in the desired direction of insertion of the threaded rod 2. Thus, the threaded rod 2 can be inserted into the substrate 22 in the direction of arrow 25 by the screwing-in system 1 according to the invention.

Figure 7:
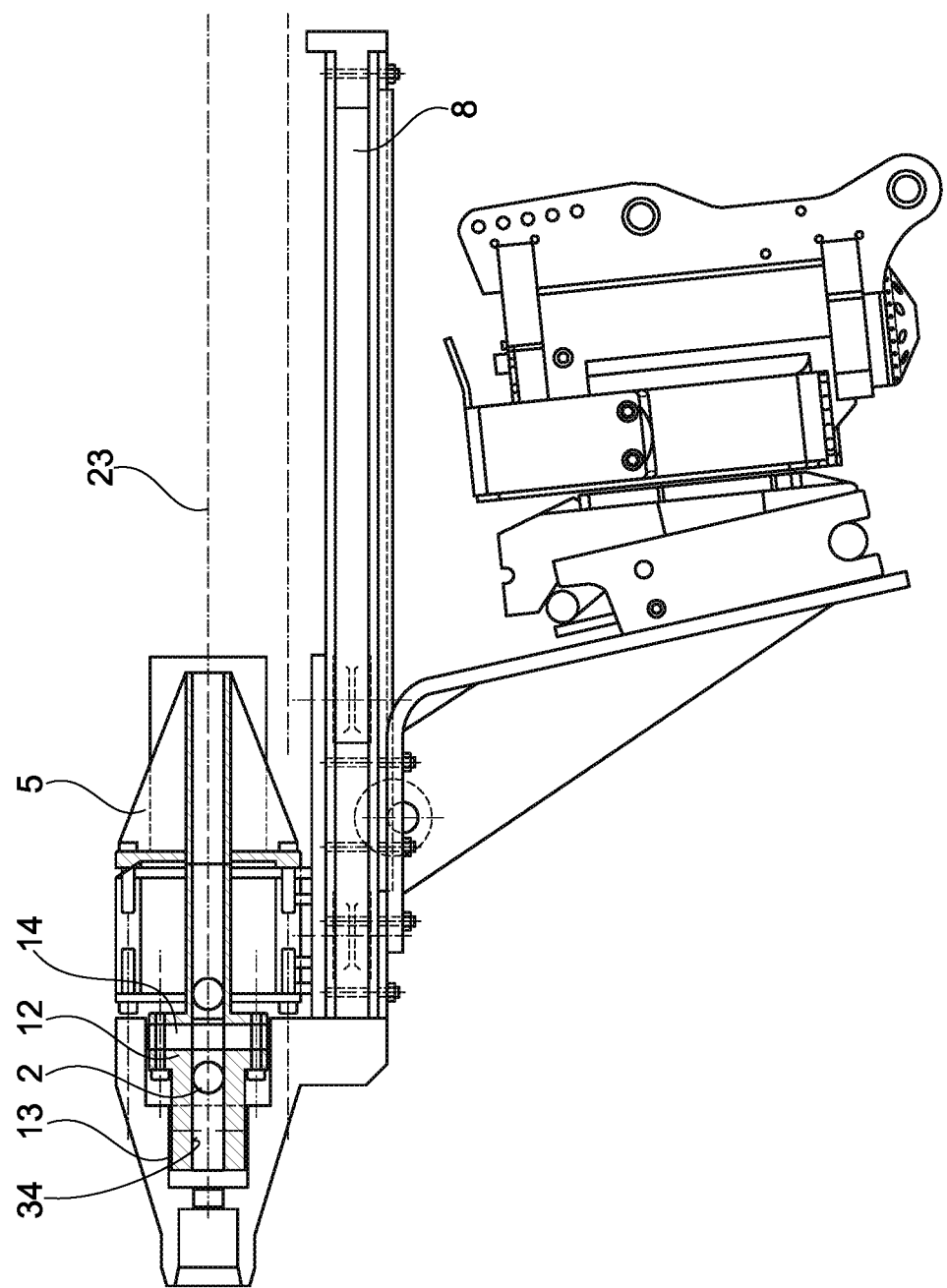
FIG. 7 shows a sectional view of the screwing-in system from the left side.

FIG. 7 shows a sectional view of the screwing-in system 1. The threaded rod 2 is guided along the threaded rod axis 23 within the drive machine 5. The drive machine 5 drives the drive sleeve 13 via the rotary coupling 14 and a flange connection 12. This drive sleeve 13 has an internal profiling 34, which enables positive engagement with the threaded rod 2, in particular its wrench flats 3. In this way, it is possible to insert the threaded rod 2 into the rotationally driven profiled drive sleeve 13, which is adapted to the profile of the threaded rod 2 described above, and there to establish the frictional connection with the flat sides of the threaded rod 2, after which the drive sleeve 13 is rotationally driven and the threaded rod 2 is screwed through the thread of the threaded socket 19 from top to bottom and driven into the soil or rock with its front end 33. The threaded rod 2 is advanced by engaging the threaded rod in the threaded socket.

Figure 8:
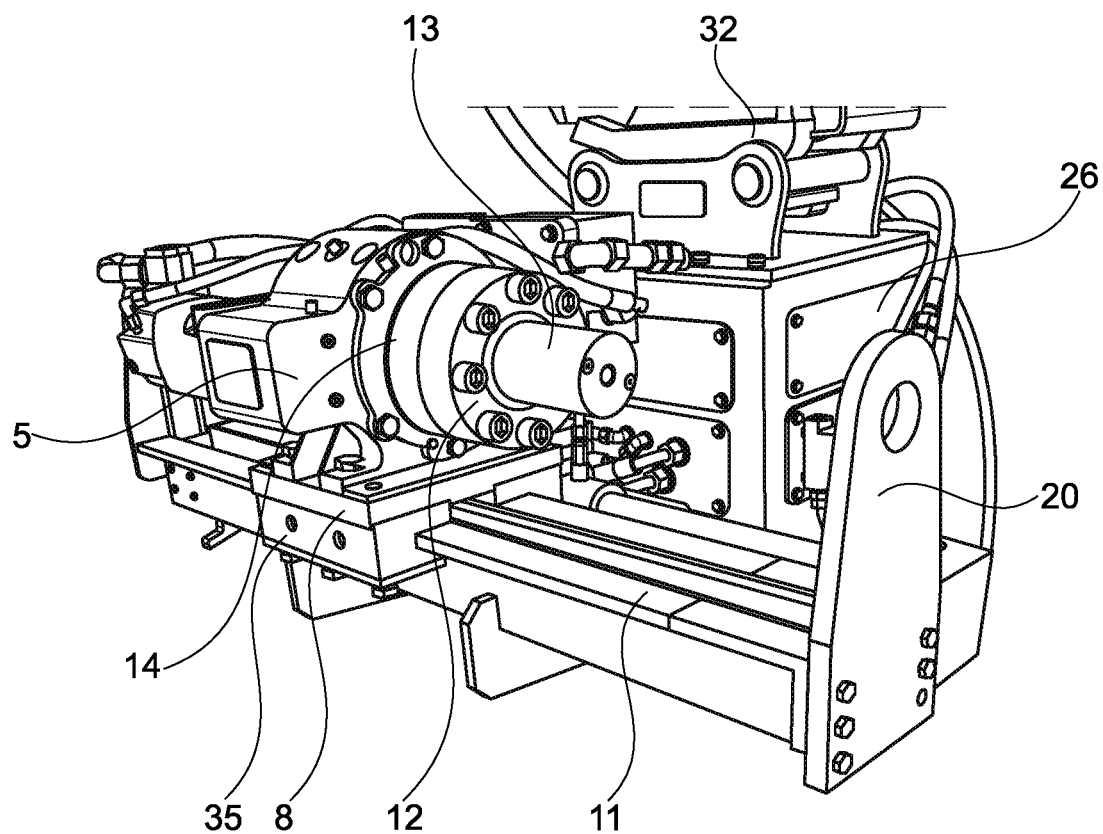
FIG. 8 shows a perspective view of the mounting without clamping device.

FIG. 8 shows a retracted drive machine 5, which is located at the insertion end in the area of the rear guide plate 9. In FIG. 8, the clamping device and threaded socket are not shown.

In order to ensure that it runs as smoothly as possible on the rails 1, the carriage 8 has sliding bodies 35 which grip laterally around the rail 11. When the screwing-in machine is put into operation, the rotating drive sleeve 13 moves in the direction of the guide plate 20, which is located at the insertion end, and drives the threaded rod 2 to rotate.

The control unit 26 is arranged on the side of the mounting 5 and a part of the boom arm 32 can be seen.

To unscrew the threaded rod 2 from the substrate 22, the drive machine 5 on the translationally movable carriage 8 is moved along the threaded rod axis 23 in accordance with the backward movement of the threaded rod 2 and the drive sleeve 13 is rotated in the direction opposite to the screwing-in direction.

Figure 9:
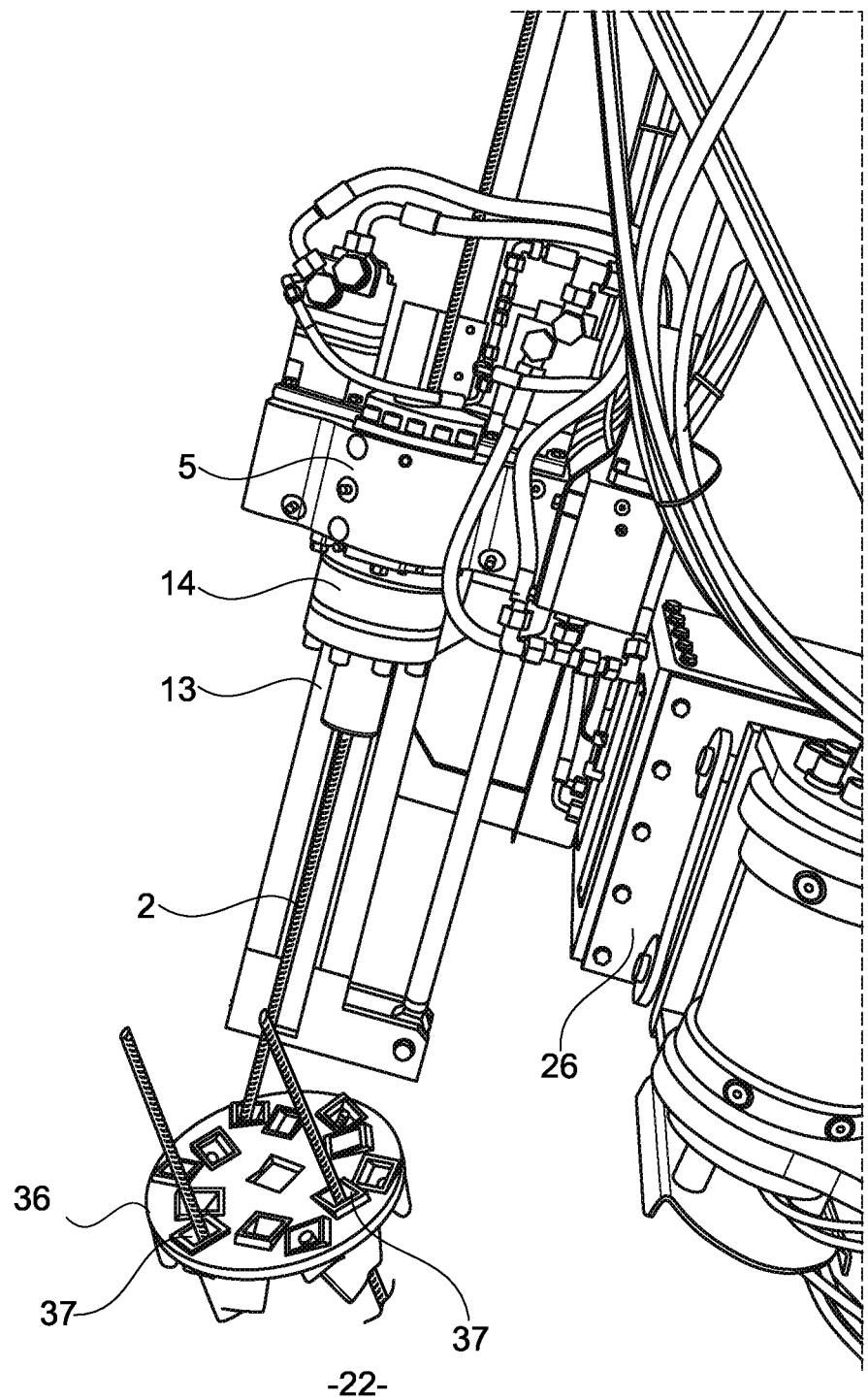
FIG. 9 shows a perspective view of the screwing-in system without clamping device in use with an anchor plate.

The present invention is not limited to the use of a threaded socket as shown in FIG. 9. In the example shown here, the thread which allows the translational movement of the threaded rod 2 into the substrate 22 is located as a threaded hole 37 in an anchor plate 36 which rests on the substrate 22. In this way, the driven threaded rod 2 rotating through the drive machine 5 or drive sleeve 13 can be inserted into the substrate 22.

DRAWING LEGEND

1. Screwing-in system
2. Threaded rod
3. Wrench flats
4. Thread
5. Drive machine
6. Mounting
7. .
8. Carriage
9. Guide plate
10. Hole
11. Rails
12. Flange connection
13. Drive sleeve
14. Rotary coupling
15. Clamping device
16. Clamping jaws
17. Clamping drive
18. Clamping opening
19. Threaded socket
20. Guide plate
21. Recess
22. Substrate
23. Threaded rod axis
24. Direction of rotation
25. Direction of arrow
26. Control unit
27. Feed drive
28. Roller
29. Underside
30. Follower roller
31. Tracked vehicle
32. Boom arm
33. End (of 2)
34. Profiling
35. Sliding body
36. Anchor plate
37. Threaded hole
38. Insertion opening
39. Opening direction

The invention claimed is:

1. A method for screwing a threaded rod into soil or rock, with a drive machine comprising a drive sleeve which produces a positive engagement on the threaded rod via an internal profiling, in order to rotationally drive the threaded rod and to screw it through the internal thread of a component, wherein the rotational movement of the threaded rod being converted into a translational movement by the internal thread of the component, characterized in that the drive machine is mounted on a translationally movable carriage which is moved along the axis of the threaded rod in accordance with the feed movement of the threaded rod and characterized in that the drive sleeve interrupts the positive-locking connection with the threaded rod during a movement of the carriage counter to the screwing-in direction in order to produce a positive-locking connection again at another region of the threaded rod and in order to drive the threaded rod rotationally again.

2. The method according to claim 1, characterized in that the threaded rod is screwed through the internal thread of a threaded socket.

3. The method according to claim 2, characterized in that the threaded rod is inserted at the rear into an insertion opening of the drive machine and is pushed through the drive sleeve, until it protrudes from the drive sleeve and stands on the thread of the threaded socket at the end of the carriage on the substrate side and is then advanced by the rotationally driven drive sleeve and by the thread engagement in the threaded socket.

4. The method according to claim 1, characterized in that the carriage is mounted on a linear supporting and guide element and is movable relative to the positionally fixed threaded socket.

5. The method according to claim 1, characterized in that, for unscrewing the threaded rod from a substrate, the drive machine is moved along on the translationally movable carriage in accordance with the retrograde movement of the threaded rod along the threaded rod axis, and the drive sleeve is rotated in the direction opposite to the screwing-in direction.

6. The method according to claim 1, characterized in that the threaded socket is positionally fixed by a clamping device which is mounted on the mounting at the substrate-side end of the carriage.

7. The method according to claim 6, characterized in that the drive sleeve has an inner profiling which ensures positive engagement with the outer surface of the threaded rod.

8. The method according to claim 7, characterized in that the positive engagement is between the profiling and lateral wrench flats of the threaded rod formed by lateral and threadless flat areas of the threaded rod.

9. The method according to claim 8, characterized in that the profiling on the inner circumference of the drive sleeve has two parallel surfaces or surfaces opposite each other at an angle.

10. The method according to claim 6, characterized in that the relative movement of the carriage along the threaded rod axis corresponds to the feed of the threaded rod.

11. The method according to claim 6, characterized in that the drive sleeve is connected to the drive machine via a flange connection in a torque-transmitting manner.

12. The method according to claim 11, characterized in that the drive sleeve is replaceable and is selected according to the expected diameter of the threaded rod.

13. The method according to claim 6, characterized in that a feed drive rotationally drives a roller or a gear wheel which rolls on the underside of the rail to move the carriage.

14. The method according to claim 6, characterized in that the mounting is mounted on the boom arm of a mobile vehicle.

15. The method according to claim 1 comprising a screwing-in system comprising a mounting with at least one rail on which the slide is translationally movable.

16. The method of claim 1 comprising screwing the threaded rod into the soil or rock.

17. The method of claim 1 comprising rotationally driving the threaded rod and screwing it through the internal thread of the component.

18. The method of claim 1 comprising moving the translationally movable carriage along the axis of the threaded rod in accordance with the feed movement of the threaded rod.

19. The method of claim 1 comprising interrupting the positive-locking connection with the threaded rod during the movement of the carriage counter to the screwing-in direction in order to produce the positive-locking connection again at another region of the threaded rod and in order to drive the threaded rod rotationally again.

* * * * *